United States Patent [19]
Azim

[11] Patent Number: 6,137,533
[45] Date of Patent: Oct. 24, 2000

[54] SYSTEM AND METHOD FOR ENHANCING DYNAMIC RANGE IN IMAGES

[75] Inventor: S. Khalid Azim, Austin, Tex.

[73] Assignee: Cirrus Logic, Inc., Fremont, Calif.

[21] Appl. No.: 08/856,468

[22] Filed: May 14, 1997

[51] Int. Cl.⁷ .......................... H04N 5/235; H04N 5/228
[52] U.S. Cl. .......................................... 348/222; 348/229
[58] Field of Search .................................. 348/222, 229, 348/230, 239, 572, 573, 678

[56] References Cited

U.S. PATENT DOCUMENTS

| | | | |
|---|---|---|---|
| 4,814,864 | 3/1989 | Pritchard | 358/29 |
| 4,851,842 | 7/1989 | Iwamatsu | 341/139 |
| 4,911,552 | 3/1990 | Kurashige et al. | 358/21 |
| 5,049,997 | 9/1991 | Arai | 358/213 |
| 5,053,877 | 10/1991 | Kondo et al. | 358/228 |
| 5,065,248 | 11/1991 | Homma | 358/228 |
| 5,093,716 | 3/1992 | Kondo et al. | 358/41 |
| 5,179,528 | 1/1993 | Robertson et al. | 364/715.02 |
| 5,258,848 | 11/1993 | Kondo et al. | 358/228 |
| 5,262,849 | 11/1993 | Mimura et al. | 358/43 |
| 5,272,539 | 12/1993 | Kondo | 358/228 |
| 5,282,043 | 1/1994 | Cochard et al. | 358/213 |
| 5,291,276 | 3/1994 | Matsumoto et al. | 348/708 |
| 5,307,158 | 4/1994 | Tsuruta et al. | 348/265 |
| 5,319,449 | 6/1994 | Saito et al. | 348/223 |
| 5,420,635 | 5/1995 | Konishi et al. | 348/362 |
| 5,448,293 | 9/1995 | Kogane et al. | 348/229 |
| 5,455,685 | 10/1995 | Mori | 348/363 |
| 5,508,739 | 4/1996 | Suh | 348/223 |
| 5,512,947 | 4/1996 | Sawachi et al. | 348/243 |
| 5,534,916 | 7/1996 | Sakaguchi | 348/222 |
| 5,539,456 | 7/1996 | Ishii | 348/224 |
| 5,585,846 | 12/1996 | Kim | 348/254 |
| 5,712,682 | 1/1998 | Hannah | 348/255 |

*Primary Examiner*—Wendy Garber
*Assistant Examiner*—Alicia Harrington
*Attorney, Agent, or Firm*—J. P. Violette; Brian W. Peterman

[57] ABSTRACT

A system and method of enhancing dynamic range in images is disclosed that increases the contrast in the resulting image without requiring an increase in the dynamic range of the analog-to-digital converter used to convert the analog image signals to digital information. The system and method disclosed achieve this advantageous result by providing per-pixel gain control circuitry and per-pixel gain selection circuitry. The analog image signal range is segmented into a number (N) of multiple levels, where N is selected to be the desired level of enhancement. Multiple analog gain (G1) levels and multiple digital gain (G2) levels are also provided. The analog gain (G1) is selected for each image pixel based upon the segment in which that pixel falls so that the signal levels may be increased for each segment to utilize the full range (R) of the analog-to-digital converter. Once digitized, a digital gain (G2) is selected for the same pixel so that on a per-pixel basis, the total gain (G1*G2) is kept substantially constant. In this way, the dynamic range of the system is increased without needing to increase the dynamic range of the ADC. The resulting digital information is enhanced by ($Log_2 N$) bits, and it may be companded down into a smaller bit range for a video output device by any desired transfer function during digital signal processing.

20 Claims, 3 Drawing Sheets

SYSTEM AND METHOD FOR ENHANCING DYNAMIC RANGE IN IMAGES

BACKGROUND OF THE INVENTION

1. Field of the Invention

The present invention relates to a system and method for obtaining a higher dynamic range in images. More particularly, the present invention relates to enhancing the signal dynamic range in imaging systems for video cameras, digital cameras, and solid-state electronic imaging devices, which utilize charge-coupled device (CCD) imagers, CMOS imagers, or other types of imagers.

2. Description of Related Art

A video camera typically contains a solid-state electronic imaging device such as a CCD (charge-coupled device) or CMOS imager for generating a video signal representing an image of a subject. Typical CCDs have a signal-to-noise ratio (SNR) of below 60 dB at a particular exposure setting. Because the CCD exposure may be changed only on a per frame (or slower) basis, the dynamic range within a single image is limited to the 60 dB range. By carefully designing the correlated double sampling circuitry (CDS) and automatic-gain-control circuitry (AGC), and by using a low noise analog-to-digital converter (ADC), the noise in the output will tend to be dominated by the CCD noise and not that of the CDS, AGC and ADC electronic circuitry. Therefore, 10-bit ADCs are adequate for typical CCD applications.

A 10-bit ADC, however, limits the dynamic range resulting in poor contrast and color depth in certain pictures or visual fields. For example, when the difference in luminance between a bright portion and a dark portion included in a visual field is large, it is difficult to adjust the gain to pick up both the dark portion and the bright portion under proper exposure conditions. If the gain is adjusted to the dark portion, the bright portion appears washed out. On the other hand, if the exposure conditions are adjusted to the bright portion, the dark portion appears black.

Conventional AGCs include control circuitry that attempts to adjust automatically the analog gain applied to the analog image signal to increase the analog signal to use the maximum range of the ADC, which is digitizing the analog image signal. This automatic adjustment is generally based upon various image parameters that are "averaged" over a single frame or multiple frames. Once the analog image signal has been digitized by the ADC, the AGC will generally also determine whether the analog gain adjustment has been effective to utilize the full signal processing range. If not, a digital gain is applied to the digitized image data to increase the digital output signal to the full range of the DSP circuitry. In this way, conventional AGCs attempt to provide per-frame or per-multiple-frame automatic gain adjustment of both analog and digital gains to increase the brightness of the image as a whole.

Conventional AGCs, however, are ineffective in high contrast situations. For example, the contrast and color depth problem discussed above becomes particularly difficult to overcome where a subject in the image is inside a room and in front of a very bright background, such as a window on a bright day. Conventional AGCs are unable to improve such high contrast images because the AGC control loop typically calculates an "average" gain over a full frame or multiple frames, and then applies the gain value uniformly to all of the pixels in the image frame. In this scheme, if the analog gain is increased to improve the low intensity portions of the image, the brighter pixels will saturate and appear washed out. On the other hand, if the analog gain is reduced to get greater contrast in the brighter portions of the image, the low intensity portions of the image will get even darker and appear black.

To solve this contrast problem, prior approaches have generally been to adjust the exposure control of the CCD to be the best possible contrast or to increase the luminance of a main subject by strobe flashing. Another prior technique has been to convert the image signal from the CCD into digital information with an ADC, and then split the image into a bright portion and a dark portion. These two portions may then be processed separately and later recombined before processing the digital pixel information with digital signal processing circuitry (DSP) to provide an analog video output signal. This prior approach, however, is not particularly effective in achieving greater resolution or handling high contrast situations.

What is needed to solve this contrast problem is a new system and approach for providing increased dynamic range without losing image information.

SUMMARY OF THE INVENTION

To solve the problems addressed above, the present invention contemplates per-pixel gain control to enhance the dynamic range and contrast in the resulting image. The present invention accomplishes this per-pixel gain control by breaking the input signal range into multiple levels (N), by applying an analog gain (G1) to each pixel before converting it to digital information, and by applying a correlating digital gain (G2) to each pixel after the digital conversion. On a per-pixel basis the total gain (G1*G2) is kept substantially constant. In this way, the dynamic range of the system is increased without increasing the dynamic range of the ADC.

One embodiment of the present invention is a per-pixel gain control system for image processing. This system may include a multiple level segment selector receiving pixel analog signals, and having an output signal indicative of a segment within which each pixel falls on a per-pixel basis; an analog gain block that receives pixel analog signals and has multiple selectable gain (G1) levels; an analog-to-digital converter receiving amplified analog signals from the analog gain block; a digital gain block receiving digitized data from the analog-to-digital converter and having multiple selectable gain (G2) levels; and a gain selector receiving the output signal from the multiple level segment selector and having gain select output signals applied to the analog gain block and the digital gain block on a per-pixel basis.

In a further embodiment, the combined per-pixel gain of the analog gain (G1) and the digital gain (G2) may be kept substantially constant, and may in particular be substantially equal to the number of levels (N) of the multiple level segment selector. These multiple levels may also be set to evenly divide a range (R) of the pixel analog signals. In a more detailed embodiment, the N gain levels for said analog gain block may be times 4 for a first segment, times 2 for a second segment, times 4/3 for a third segment, and times 1 for a fourth segment, and the N gain levels for said digital gain block may times I for a first segment, times 2 for a second segment, times 3 for a third segment, and times 4 for a fourth segment. Also, the N multiple levels of the pixel analog signal may include a first level from 0 to R/4, a second level from R/4 to R/2, a third level from R/2 to 3R/4, and a fourth level from 3R/4 to R.

In a separate embodiment, a per-pixel gain control system for image processing may include segmentation circuitry segmenting an analog image signal into multiple segment levels and providing a segment control signal indicative of which segment level among said multiple segment levels image pixels fall on a per-pixel basis; analog gain circuitry applying a per-pixel gain to the analog image signal and having gain levels associated with each of the multiple segment levels; an analog-to-digital converter digitizing amplified analog signals from the analog gain circuitry; digital gain circuitry applying a per-pixel gain to the digitized signals from the analog-to-digital converter and having gain levels associated with each of the multiple segment levels; and gain selection circuitry receiving the segment control signal and applying a gain selection signal to the analog gain circuitry and the digital gain circuitry to choose an analog gain level (G1) and a digital gain level (G2) associated with the segment level in which image pixels fall on a per-pixel basis. The per-pixel gain control system may also include exposure control circuitry that receives the segment control signal to control an exposure setting for a charge-coupled device imager.

An embodiment of the present invention is also a method for improving the dynamic range in images by dividing an analog image input range into multiple segments; determining within which segment image pixels fall on a per-pixel basis; applying to each image pixel an analog gain level (G1) dependent upon the segment in which each image pixel falls; converting analog image pixel information into digital image pixel information; and applying to each image pixel a digital gain level (G2) dependent upon the segment in which each image pixel falls. In this method, the analog gain level (G1) and the digital gain level (G2) may be applied so that a total gain for each pixel of G1 times G2 is maintained to be substantially constant for all image pixels. In a further step, a level of enhancement may be selected by choosing a desired number (N) of segments into which to divide said analog image input.

A further embodiment of the present invention is a per-pixel gain selector for a gain control system in an image processing system, including a multiple level analog gain selector having an analog output gain selecting signal communicating with an analog gain block, and a multiple level digital gain selector having a digital output gain selecting signal communicating with a digital gain block. Each gain selector provides gain selecting signals dependent upon an image signal on a per-pixel basis. The multiple level analog gain selector and the multiple level digital gain selector may also cooperate to provide a substantially constant combined per-pixel gain. Also, the multiple level analog gain selector and the multiple level digital gain selector may select gain levels for groups of image pixels.

Related to this further embodiment is a method for selecting analog and digital gain levels to apply to an image signal to improve dynamic range in resulting images. This method includes selecting for an image pixel an analog gain level dependent upon a signal level of the image pixel, and selecting for the image pixel a digital gain level dependent upon the signal level of the image pixel. This method may include selecting gain levels for each image pixel within an image signal, and may include selecting steps for groups of image pixels within an image signal.

BRIEF DESCRIPTION OF THE DRAWINGS

It is to be noted that the appended drawings illustrate only particular embodiments of the invention and are, therefore, not to be considered limiting of its scope, for the invention may admit to other effective embodiments.

DESCRIPTION OF THE PREFERRED EMBODIMENTS

The present invention involves assembling a digital sample of the pixel at the output of the ADC that has a dynamic range higher than the analog-to-digital converter (ADC). For example, having a pixel dynamic range of 12 bits, even though the ADC has only a 10-bit range. This digital image stream, having a wider dynamic range, may then be mapped non-linearly into a 10-bit word to get a video output image with good contrast.

To accomplish this increased dynamic range without increasing the ADC range, the present invention first segments the input signal into N-levels. A fixed analog gain is then applied corresponding to the level associated with the signal to maximize the signal at the input of the ADC. Next, the gain is adjusted on a pixel-by-pixel basis so that each pixel is multiplied by the appropriate gain needed to place it into the ADC's full input signal range (R). The M-bit output of the ADC is then mapped into a $(M+\log_2 N)$ bit digital word, thereby increasing the dynamic range by $(\log_2 N)$ bits. The digital samples may then be mapped back into an M-bit (or other size) word using non-linear mapping such as a logarithmic transfer function. At this point, a variety of transfer curves may be digitally applied based on the image characteristics. This mapping may also be done after the data has been converted into RGB (red-green-blue) format.

The information about the signal level also provides a ready means of computing the histogram of the image. This may be used to determine the gain setting for the electronic exposure control of a charge-coupled device (CCD) imager. The exposure control of the CCD would still be done on a frame-by-frame basis using statistics about the frame. Although the discussion below relates primarily to CCD imagers, the present invention is also applicable to CMOS imagers and other imagers that provide image signal information.

Figure 1:
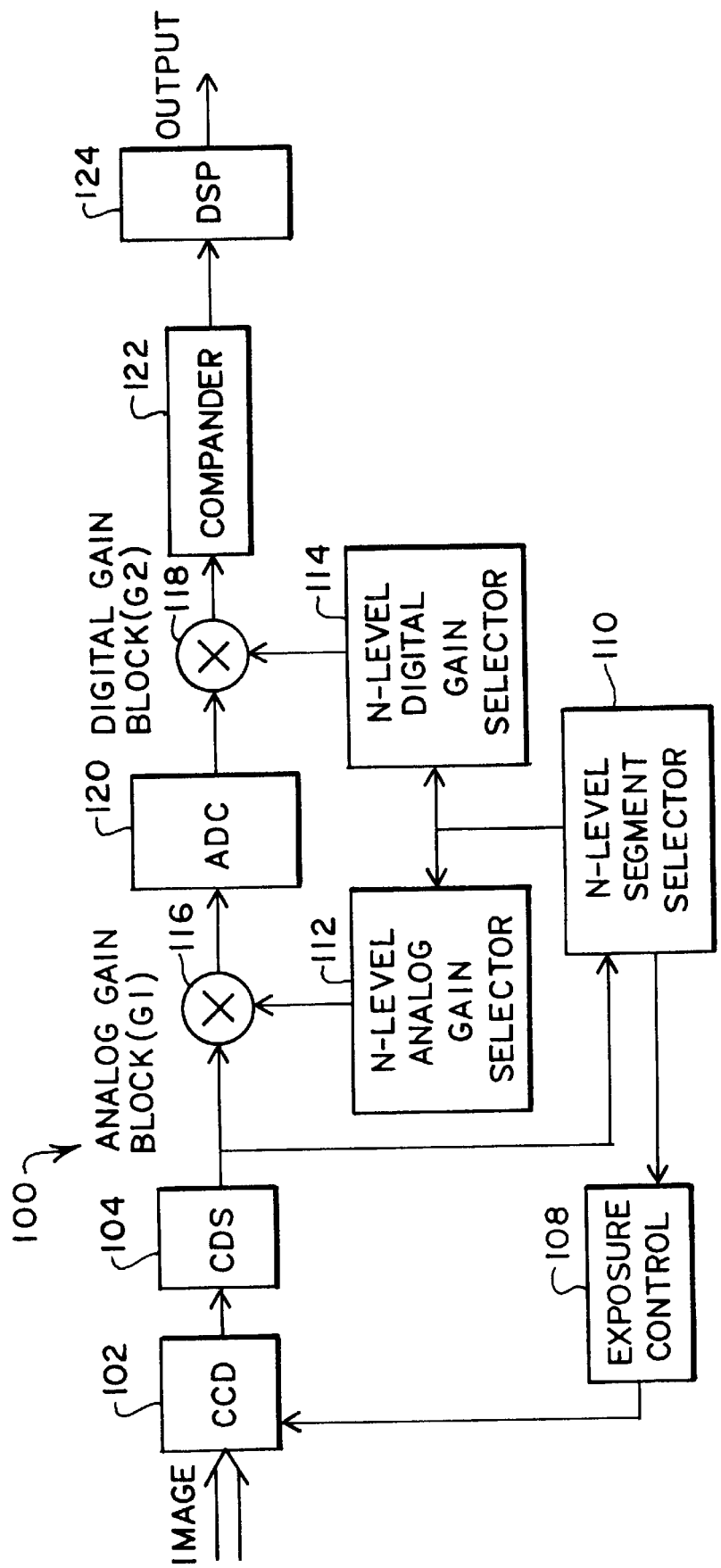
FIG. 1 is a block diagram of an image processing system including a per-pixel N-level segment selector, along with N-level analog and digital gain selectors, according to the present invention.

Referring to FIG. 1, a block diagram is provided of a system, according to the present invention, for enhancing contrast and dynamic range of digitized output from a CCD. In system 100, CCD 102 receives an image from its visual frame. The CCD 102 processes this image and provides analog output signals representing pixel data within the visual frame of CCD 102. The analog output of CCD 102 is then processed by correlated double sampling (CDS) circuitry 104. The analog gain block 116 applies an analog gain to the output of CDS 104, and the output of the analog gain block 116 is digitized by the ADC 120. Digital gain block 118 then applies a digital gain to the digitized data, and this digital information is ultimately processed by digital signal processing (DSP) circuitry 124 to produce a video output signal.

In a conventional image processing system, a gain and exposure control circuitry would receive digitized image data from the output of the ADC. The gain and exposure control circuitry would then use this digital information averaged over a per-frame or per-multiple-frame basis to set the exposure level of the CCD and to set the gain applied by the analog gain block and the digital gain block. If the average pixel data in the visual frame of CCD were too bright or too dark, the gain and exposure control circuitry would attempt to compensate by automatically adjusting the exposure setting on CCD and the gain applied by analog gain block 116. In addition, the gain and exposure control circuitry of a conventional system would analyze the output of the ADC to determine if the automatic analog gain control had been effective in taking advantage of the full processing range of the system. If not, an appropriate digital gain would be applied to the digitized data by the digital gain block. In conventional systems, the exposure and gain settings are applied uniformly for the entire image frame.

The present invention, as depicted in the embodiment in FIG. 1, provides a per-pixel gain adjustment that enhances dynamic range in the video output signals. As contemplated by the present invention, the analog gain block 116 and the digital gain block 118 act together to provide a substantially constant per-pixel gain, which increases the dynamic range of the system without requiring an increase in the dynamic range of the ADC 120.

To accomplish this advantageous result, the pixel analog signals are first broken into multiple segments by an N-level segment selector 110. In other words, if the range of the signals from CDS 104 is from 0 to R, N-level segment selector 110 would break the range into R/N segments, where N is the enhancement factor desired. For each analog pixel signal, the N-level segment selector 110 determines where within the R/N segments the pixel signal falls. Once N-level segment selector 110 has made this determination, it provides an encoded segment control word indicative of this determination to N-level analog gain selector 112 and N-level digital gain selector 114. This encoded word is also provided to exposure control 108, which may utilize this information to determine the appropriate frame exposure for the CCD 102. For the present invention, therefore, there is no need for an additional control circuitry to provide pixel information to the exposure control block 108.

Based upon the encoded word from segment selector 110, analog gain selector 112 acts to select the gain level (GI) for analog gain block 116. Analog gain block 116 may be designed to have N selectable levels, with each level being associated with separate analog signal segment. The gain (G1) for the different levels may be set to be N/S, where S represents the segment number from 1 to N. The analog gain (GI) for a given pixel signal may be selected to be $N/S_{pixel}$, where $S_{pixel}$ is the segment number within which the pixel signal fell.

Similarly, based upon the encoded word from segment selector 110, digital gain selector 114 acts to set the gain level (G2) for digital gain block 118. Digital gain block 118 may also be designed to have N selectable levels, with each level being associated with separate analog signal segment. The gain (G2) for the different levels may be set to be N/G1, where G1 represents the analog gain applied to a particular pixel prior to its being digitized by ADC 120. The digital gain (G1) for a given pixel signal, therefore, would be equal to the segment number $S_{pixel}$ in which the analog pixel signal fell (G2=N/G1=N/(N/$S_{pixel}$=$S_{pixel}$). The gain (G2) is applied to the pixel signal after it has been digitized by the ADC 120.

The analog gain (G1) and the digital gain (G2) combine to provide a gain for each pixel that is substantially constant and equal to the number of segments (N) into which the output signal from CDS 104 is broken (G1*G2=N). For a M-bit ADC 120, the enhancement achieved is ($Log_2N$) bits, and the dynamic range at the output of digital gain block 118 is (M+$Log_2N$) bits. Thus, the number of segments (N) may be selected to achieve a desired enhancement and increased dynamic range.

The gain (GI) applied by analog gain block 116 is adjusted such that any given pixel signal is preferably not pushed out of the range (R) of the ADC 120. Thus, small pixel signals are provided with a relatively large gain as compared to large pixel signals. Once ADC 120 converts the analog pixel signals into digital information, digital gain block 118 applies a second gain (G2) for the pixel signals. The gain (G2) provided by digital gain block 118 ensures that G2=N/G1, and thereby that G1*G2=N. Thus, small analog pixel signals that received a large gain from analog gain block 116 will receive a small gain from digital gain block 118. Similarly, large analog pixel signals that received a small gain from analog gain block 116 will receive a large gain from digital gain block 118. In this way, the present invention provides pixel-by-pixel N-times gain enhancement at the output of digital gain block 118.

The output of digital gain block 118, which has dynamic range of (M+$Log_2N$) bits, may be reduced by a non-linear compander 122 to a lower number of bits for processing by DSP 124 into a video output signal. This companding may also be done at any desired stage within the DSP 124 or after the DSP 124.

It is noted that the output signal from the digital gain block 118 may be processed as desired before converting the digital information into a video output signal. It is also noted that N-level analog gain selector 112 and N-level digital gain selector 114 may be combined into a single operational block, or may be separated into more than two operational blocks. The purpose of gain selectors 112 and 114 is to select a gain level for gain blocks 116 and 118. It is further noted that although the embodiment depicted in FIG. 1 has the same number (N) gain levels selected by gain selectors 112 and 114 as segments created in segment selector 110, the number of selectable gain levels do not have to be identical to the number of segments, and analog gain block 116 may have a different number of selectable gain levels than digital gain block 118. Finally, it is noted that the analog segmentation of the image analog signal may be accomplished at a desired place on the analog side of the system, and does not have to be taken from the output of CDS 104.

Figure 2:
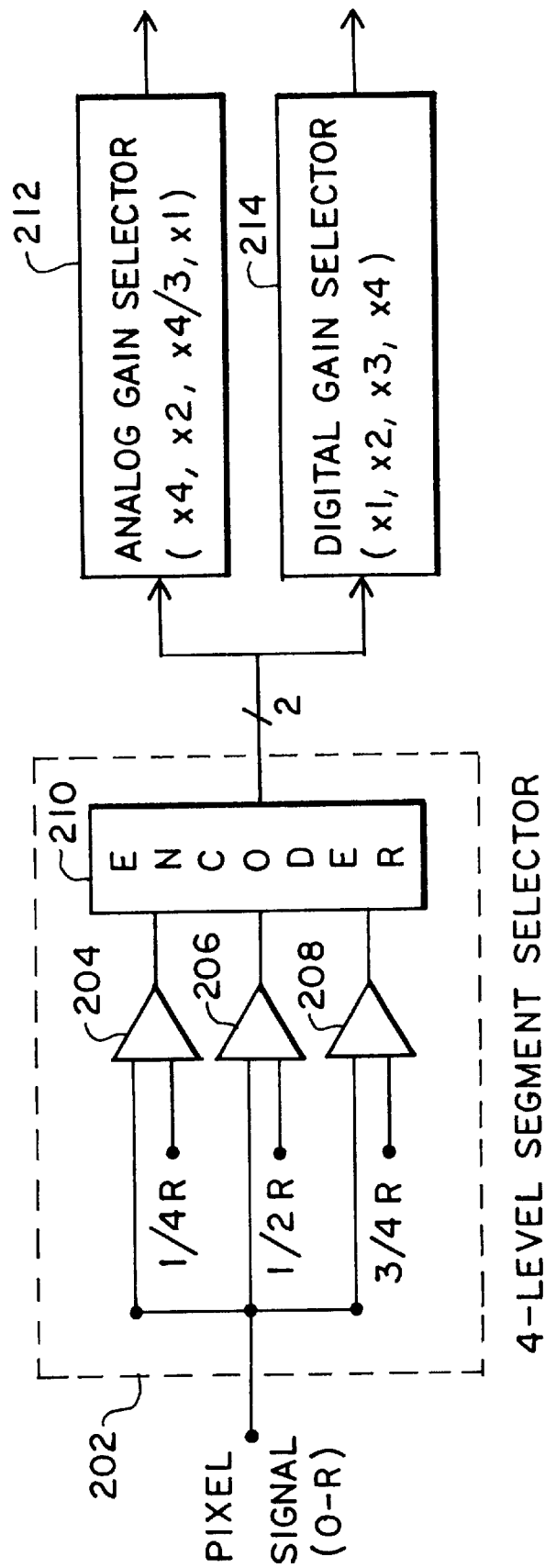
FIG. 2 is a block diagram of a 4-level segment selector, including multiple comparators, along with 4-level analog and digital gain selectors, according to the present invention.

Referring now to FIG. 2, a further embodiment of the present invention is depicted in which a 4-level segmentation has been implemented. In the description of FIG. 1 above, N is now 4, and four gain levels have been chosen for gain blocks 116 and 118. The 4-level segment selector 202 receives the analog pixel signal from CDS 104. This pixel signal is assumed to have a signal range from 0 to R, with R being the range (R) of the ADC 120. To break the pixel signal range into 4 segments, segment selector 202 may include three comparators 204, 206, and 208. Comparator 204 may receive the analog pixel signal and compare it to a level of ¼(R). Comparator 206 may receive the analog pixel signal and compare it to a level of ½(R). And comparator 208 may receive the analog pixel signal and compare it to a level of ¾(R). The outputs of comparators 204, 206 and 208 may then be provided to an encoder 210. In the embodiment shown in FIG. 2, encoder 210 provides a 2-bit word indicating in which of the four segment the pixel fell.

Analog gain selector 212 and digital gain selector 214 use this 2-bit word to select the appropriate gain levels for the pixel signal. Because the analog pixel signal is being broken into 4 segments, the total gain provided to each pixel will be times 4 (G1*G2=4), regardless of the segment in which the pixel falls. For example, if the pixel signal is below ¼(R), the analog gain selector 212 will select a gain of times 4 (x4) for analog gain block (G1) 116. Once that pixel signal is digitized, for example into a 10-bit word by a 10-bit ADC 120, digital gain selector 214 will select for the same pixel a gain level of times 1 (x1) for digital gain block (G2) 118. The total gain received by the pixel signal is times 4 (x4). Similarly, a pixel level between ¼(R) and ½(R) will receive an analog gain of x2 and a digital gain of x2. A pixel signal between 112(R) and 314(R) will receive an analog gain of x(4/3) and a digital gain of x3. Finally, a pixel signal above ¾(R) will receive an analog gain of x1 and a digital gain of x4. Thus, any given pixel will always receive a gain equal to G1*G2=N=.

Accordingly, the dynamic range is increased by 2 bits ($Log_2 N=Log_2 4=2$). For a 10-bit ADC 120, therefore, the dynamic range is increased from 10 bits to 12 bits. The SNR, however, would still be limited to below 60 dB, assuming it is dominated by the CCD's output. Although the present invention does not improve the SNR, it does increase dynamic range, which results in a much more pleasing image.

Figure 3:
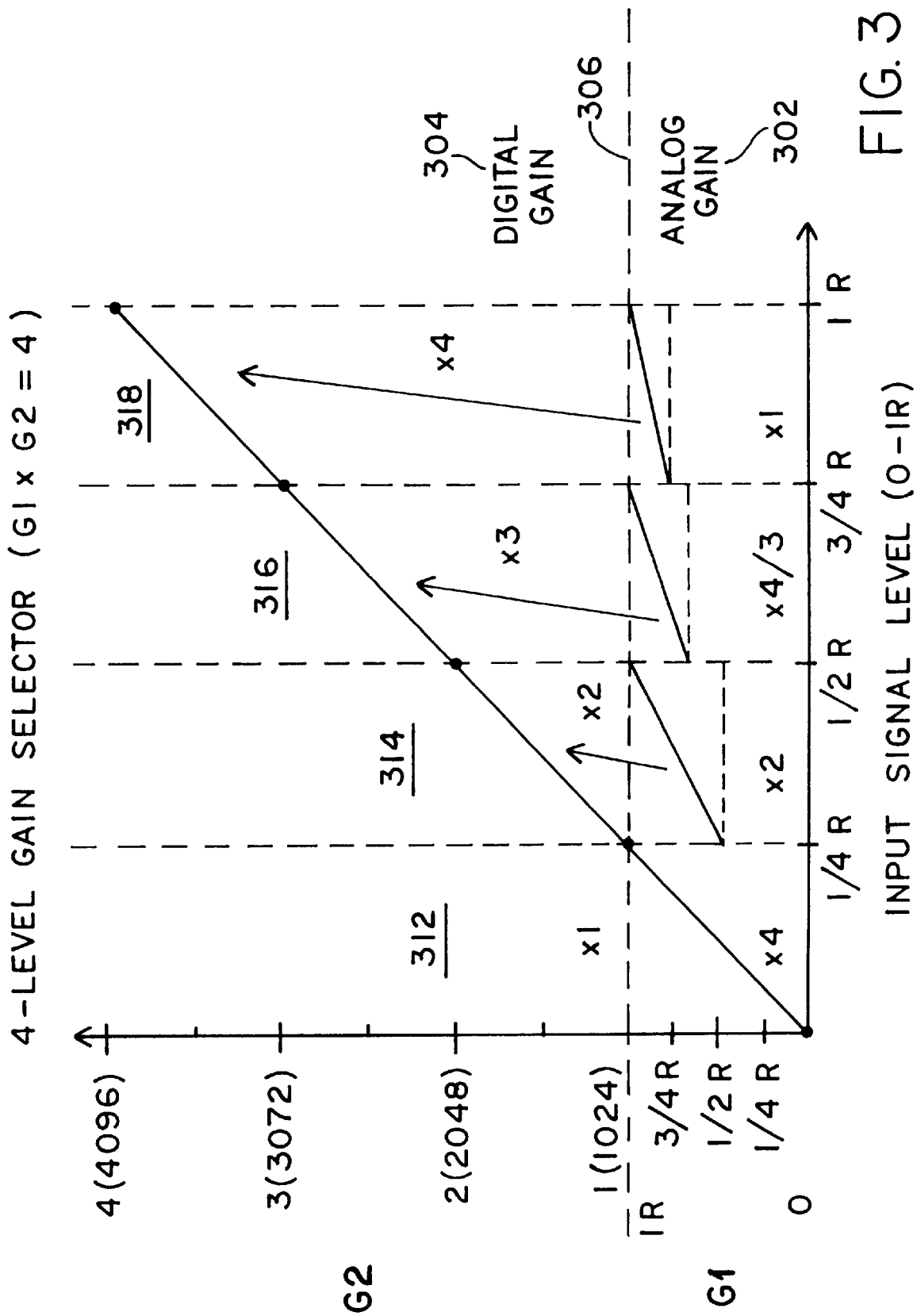
FIG. 3 is a graphical depiction of a 4-level gain selector, according to the present invention, that provides for the combination of analog gain (G1) and digital gain (G2) for each pixel to be substantially constant.

Referring now to FIG. 3, a diagram is provided that graphical depicts a 4-level gain selector, such as associated with the embodiment depicted in FIG. 2. The input signal level ranges linearly from 0 to R for the analog pixel signal, with R representing the range (R) of the ADC 120. The input signal level is provided at the bottom of FIG. 3. Dotted line 306 represents a graphical division between the digital gain (G2) region 304, which is above dotted line 306, and the analog gain (G1) region 302, which is below dotted line 306. The input signal is broken into four segments 312, 314, 316, and 318.

In segment 312 ($S_{pixel}=1$), input signal levels range from 0 to ¼R). The analog gain (G1) is x4, yielding an after gain signal level range from 0 to 1R, which is shown in FIG. 3. The digital gain (G2) in segment 312 is x1, yielding an after gain signal level range of 0 to 1R. The total gain (G1*G2) is times four (N=4).

In segment 314 ($S_{pixel}=2$), input signal levels range from ¼(R) to ½(R). The analog gain (G1) is x2, yielding an after gain signal level range from ½(R) to 1R, which is shown in FIG. 3. The digital gain (G2) in segment 314 is x2, yielding an after gain signal level range of 1R to 2R. The total gain (G1*G2) is times four (N=4).

In segment 316 ($S_{pixel}=3$), input signal levels range from ½R) to ¾(R). The analog gain (G1) is x(4/3), yielding an after gain signal level range from ⅔(R) to 1R, which is shown in FIG. 3. The digital gain (G2) in segment 316 is x3, yielding an after gain signal level range of 2R to 3R. The total gain (G1*G2) is times four N=4).

In segment 318 ($S_{pixel}=4$), input signal levels range from ¾(R) to 1R. The analog gain (G1) is x1, yielding an after gain signal level range from ¾(R) to 1R, which is shown in FIG. 3. The digital gain (G2) in segment 318 is x4, yielding an after gain signal level range of 3R to 4R. The total gain (G1*G2) is times four (N=4).

Thus, the result of a 4-level gain selector (G1*G2=4) as depicted in FIG. 3 is to enhance the per-pixel analog signal range from 0-R to 0-4R. On the analog side of ADC 120, the per-pixel signal is split and given as much gain as possible without exceeding the range of the ADC 120, which would result in saturating ADC 120 and losing contrast and color information. On the digital side of ADC 120, the per-pixel signal is given enough gain to make the total gain equal to the number of levels into which the input analog signal was split. For the embodiment depicted in FIG. 2 and FIG. 3, and a 10-bit ADC 120, the normal 10-bit dynamic range of the image processing system has been enhanced by 2-bits to a 12-bit dynamic range. Significantly, the present invention has accomplished this by providing a per-pixel gain selection.

To summarize for the N=4 level segment selector, the input signal level from CDS 104 is first checked by a series of comparators and a two-bit segment selector control signal is generated to identify the segment number. Based on the segment number, an analog gain is applied to the input signal to maximize the usage of the ADC range. This is illustrated in FIG. 3. At the output of the ADC, an appropriate digital gain is applied to put the signal in the correct range of the 12-bit digital word. The product of the two gains (G1*G2) is equal to the desired overall increase in dynamic range. In FIG. 2 and FIG. 3, this overall increase is times 4 or 2-bits. The full 12-bit signal may then be companded down to 10 bits by using a logarithmic curve or some other desired transfer characteristic in compander 122. In addition, as stated above, a side benefit to the segmentation provided in segment selector 110 is that the segment select information may be used to create a histogram of the image, which may be used by exposure control block 108 to compute a slowly varying gain for the electronic exposure control.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as presently preferred embodiments. Equivalent elements may be substituted for those illustrated and described herein, and certain features of the invention may be utilized independently of the use of other features, all as would be apparent to one skilled in the art after having the benefit of this description of the invention.

What is claimed is:

1. A per-pixel gain control system for image processing, comprising:

a multiple level segment selector receiving pixel analog signals and having an output signal indicative of a segment within which each pixel falls on a per-pixel basis;

an analog gain block receiving pixel analog signals and having multiple selectable gain (G1) levels;

an analog-to-digital converter receiving amplified analog signals from said analog gain block;

a digital gain block receiving digitized data from said analog-to-digital converter and having multiple selectable gain (G2) levels; and a gain selector receiving said output signal from said multiple level segment selector and having gain select output signals applied to said analog gain block and said digital gain block on a per-pixel basis;

wherein a combined per-pixel gain of said analog gain (G1) and said digital gain (G2) is substantially constant; and wherein said combined per-pixel gain is substantially equal to the number of levels (N) of said multiple level segment selector.

2. The per-pixel gain control system of claim 1, wherein said multiple levels of said multiple level segment selector are set to evenly divide a range (R) for said pixel analog signals.

3. The per-pixel gain control system of claim 2, wherein said analog gain block and said digital gain block each has N gain levels.

4. The per-pixel gain control system of claim 3, wherein N is 4.

5. The per-pixel gain control system of claim 4, wherein said analog-to-digital converter is a 10-bit device.

6. The per-pixel gain control system of claim 4, wherein said N gain levels for said analog gain block are times 4 for a first segment, times 2 for a second segment, times 4/3 for a third segment, and times 1 for a fourth segment; and wherein said N gain levels for said digital gain block are times 1 for a first segment, times 2 for a second segment, times 3 for a third segment, and times 4 for a fourth segment.

7. The per-pixel gain control system of claim 1, wherein said N multiple levels of said pixel analog signals are four levels, and include a first level from 0 to R/4, a second level from R/4 to R/2, a third level from R/2 to 3R/4, and a fourth level from 3R/4 to R.

8. A per-pixel gain control system for image processing, comprising:

segmentation circuitry segmenting an analog image signal into multiple segment levels and providing a segment control signal indicative of which segment level among said multiple segment levels image pixels fall on a per-pixel basis;

analog gain circuitry applying a per-pixel gain to said analog image signal and having multiple gain levels with at least one of said multiple gain levels associated with each of said multiple segment levels;

an analog-to-digital converter digitizing amplified analog signals from said analog gain circuitry;

digital gain circuitry applying a per-pixel gain to said digitized signals from said analog-to-digital converter and having multiple gain levels with at least one of said multiple gain levels associated with each of said multiple segment levels; and rain selection circuitry receiving said segment control signal and applying a gain selection signal to said analog gain circuitry and said digital gain circuitry to choose said at least one analog gain level (G1) and said at least one digital gain level (G2) associated with said segment level in which image pixels fall on a per-pixel basis;

wherein said multiple segment levels, said multiple analog gain levels, and said multiple digital gain levels are an equal number (N).

9. A per-pixel gain control system for image processing, comprising:

segmentation circuitry segmenting an analog image signal into multiple segment levels and providing a segment control signal indicative of which segment level among said multiple segment levels image pixels fall on a per-pixel basis;

analog gain circuitry applying a per-pixel gain to said analog image signal and having multiple gain levels with at least one of said multiple gain levels associated with each of said multiple segment levels;

an analog-to-digital converter digitizing amplified analog signals from said analog gain circuitry;

digital gain circuitry applying a per-pixel rain to said digitized signals from said analog-to-digital converter and having multiple gain levels with at least one of said multiple gain levels associated with each of said multiple segment levels; and gain selection circuitry receiving said segment control signal and applying a gain selection signal to said analog gain circuitry and said digital gain circuitry to choose said at least one analog gain level (G1) and said at least one digital gain level (G2) associated with said segment level in which image pixels fall on a per-pixel basis;

wherein said segmentation circuitry includes a plurality of comparators to determine a segment level for each said image pixel.

10. A per-pixel gain control system for image processing, comprising:

segmentation circuitry segmenting an analog image signal into multiple segment levels and providing a segment control signal indicative of which segment level among said multiple segment levels image pixels fall on a per-pixel basis;

analog gain circuitry applying a per-pixel gain to said analog image signal and having multiple gain levels with at least one of said multiple gain levels associated with each of said multiple segment levels;

an analog-to-digital converter digitizing amplified analog signals from said analog gain circuitry;

digital gain circuitry applying a per-pixel gain to said digitized signals from said analog-to-digital converter and having multiple gain levels with at least one of said multiple gain levels associated with each of said multiple segment levels; and gain selection circuitry receiving said segment control signal and applying a gain selection signal to said analog gain circuitry and said digital gain circuitry to choose said at least one analog gain level (G1) and said at least one digital rain level (G2) associated with said segment level in which image pixels fall on a per-pixel basis; and exposure control circuitry receiving said segment control signal to control an exposure setting for a charge-coupled-device imager.

11. A method for improving dynamic range in images, comprising:

dividing an analog image input range into multiple segments;

determining within which segment of said multiple segments image pixels fall on a per-pixel basis;

applying to each said image pixel an analog pain level (G1) dependent upon said segment in which each said image pixel falls;

converting analog image pixel information into digital image pixel information; and applying to each said image pixel a digital gain level (G2) dependent upon said segment in which each said image pixel falls;

selecting a level of enhancement by choosing a desired number (N) of segments into which to divide said analog image input; and providing as many selectable analog gain levels as said desired number (N), and providing as many selectable digital gain levels as said desired number (N).

12. The method of claim 11, further comprising applying said analog gain level (G1) and said digital gain level (G2) so that a combined gain of G1 times G2 is said desired number (N).

13. A per-pixel gain selector for a gain control system in an image processing system comprising:

a multiple level analog rain selector having an analog output gain selecting signal communicating with an analog gain block, said analog output rain selecting signal being dependent upon an image signal on a per-pixel basis; and a multiple level digital gain selector having a digital output gain selecting signal communicating with a digital gain block, said digital output gain selecting signal being dependent upon an image signal on a per-pixel basis;

wherein said multiple level analog gain selector and said multiple level digital gain selector cooperate to provide a substantially constant combined per-pixel gain of said analog gain and said digital gain; and wherein said multiple level analog gain selector and said multiple level digital gain selector each selects from a same number of gain levels (N).

14. The per-pixel gain selector of claim 13, wherein said combined per-pixel gain is substantially equal to said number of gain levels (N).

15. A per-pixel gain selector for a gain control system in an image processing system, comprising:

a multiple level analog gain selector having an analog output gain selecting signal communicating with an analog gain block, said analog output gain selecting signal being dependent upon an image signal on a per-pixel basis; and a multiple level digital gain selector having a digital output gain selecting signal communicating with a digital gain block, said digital output gain selecting signal being dependent upon an image signal on a per-pixel basis;

wherein said multiple level analog gain selector and said multiple level digital gain selector select gain levels for groups of image pixels.

16. A method for selecting analog and digital gain levels to apply to an image signal to improve dynamic range in resulting images, comprising:

selecting for an image pixel an analog gain level dependent upon a signal level of said image pixel; and selecting for said image pixel a digital gain level dependent upon said signal level of said image pixel;

wherein both selecting steps are done for each image pixel within an image signal.

17. A method for selecting analog and digital gain levels to apply to an image signal to improve dynamic range in resulting images, comrising:

selecting for an image pixel an analog gain level dependent upon a signal level of said image pixel; and selecting for said image pixel a digital gain level dependent upon said signal level of said image pixel;

wherein both selecting steps are done for groups of image pixels within an image signal.

18. A per-pixel gain control system for processing, comprising:

a multiple level segment selector receiving pixel analog signals, and having an output signal indicative of a segment within which each pixel falls on a per-pixel basis depending upon a magnitude of a signal level for said pixel;

an analog gain block receiving pixel analog signals and having multiple selectable gain (G1) levels of a gain of one or higher;

an analog-to-digital converter receiving amplified analog signals from said analog gain block;

a digital gain block receiving digitized data from said analog-to-digital converter and having multiple selectable gain (G2) levels of a gain of one or higher;

a gain selector receiving said output signal from said multiple level segment selector and having gain select output signals applied to said analog gain block and said digital gain block on a per-pixel basis; and a compander coupled to receive an output signal from said digital gain block having M+N-bits of precision, and wherein said analog-to-digital converter has M-bits of precision and said compander has an output signal of less than said M+N-bits of precision;

wherein different analog gain (G1) levels and different digital gain (G2) levels are used for pixels within a single image.

19. A per-pixel gain control system for image processing, comprising:

segmentation circuitry segmenting an analog image signal into multiple segment levels and providing a segment control signal indicative of which segment level among said multiple segment levels image pixels fall on a per-pixel basis depending upon a magnitude of a signal level for said pixels;

analog pain circuitry applying a per-pixel gain to said analog image signal and having multiple gain levels of a gain of one or higher with at least one of said multiple gain levels associated with each of said multiple segment levels;

an analog-to-digital converter digitizing amplified analog signals from said analog gain circuitry;

digital gain circuit applying a per-pixel gain to said digitized signals from said analog-to-digital converter and having multiple gain levels of a gain of one or higher with at least one of said multiple gain levels associated with each of said multiple segment levels;

gain selection circuitry receiving said segment control signal and applying a gain selection signal to said analog gain circuitry and said digital pain circuitry to choose said at least one analog gain level (G1) and said at least one digital gain level (G2) associated with said segment level in which image pixels fall on a per-pixel basis; and a compander coupled to receive an output signal from said digital gain circuitry having M+N-bits of precision, and wherein said analog-to-digital converter has M-bits of precision and said compander has an output signal of less than M+N-bits of precision;

wherein different analog gain (G1) levels and different digital gain (G2) levels are used for pixels within a single image.

20. A method for improving dynamic range in images, comprising.

dividing an analog image input range into multiple segments;

determining within which segment of said multiple segments image pixels fall on a per-pixel basis depending upon a magnitude of a signal level for said pixels;

applying to each said image pixel an analog gain level (G1) of one or higher dependent upon said segment in which each said image pixel falls; and converting analog image pixel information into digital image pixel information;

applying to each said image pixel a digital gain level (G2) of one or higher dependent upon said segment in which each said image pixel falls;

wherein different analog gain (G1) levels and different digital gain (G2) levels are selected for pixels within a single image; and wherein said converting step produces an output signal having M-bits of precision, and wherein said step of applying a digital gain level produces an output signal having M+N-bits of precision, and further comprising mapping said M+N-bit output signal to a signal having less than said M+N-bits.

* * * * *

UNITED STATES PATENT AND TRADEMARK OFFICE
CERTIFICATE OF CORRECTION

PATENT NO.: 6,137,533
DATED: OCTOBER 24, 2000
INVENTOR(S): AZIM

It is certified that error appears in the above-identified patent and that said Letters Patent is hereby corrected as shown below:

In claim 8, column 9, line 39, delete "rain," and insert --gain--.

In claim 9, column 9, line 63, delete "rain," and insert --gain--

Signed and Sealed this

Twenty-second Day of May, 2001

*Attest:*

NICHOLAS P. GODICI

*Attesting Officer*  Acting Director of the United States Patent and Trademark Office